United States Patent

[11] 3,621,353

[72] Inventor Joseph Brian Matley
Monte Sereno, Calif.
[21] Appl. No. 876,777
[22] Filed Nov. 14, 1969
[45] Patented Nov. 16, 1971
[73] Assignee Ampex Corporation
Redwood City, Calif.

[54] PHASE LOCK, SPEED CONTROL SYSTEM
6 Claims, 2 Drawing Figs.

[52] U.S. Cl. .................... 318/314
[51] Int. Cl. .................... H02p 5/06
[50] Field of Search .................... 318/314, 319, 329

[56] References Cited

UNITED STATES PATENTS 3,008,075 11/1961 Scott .................... 318/314

*Primary Examiner*—Oris L. Rader
*Assistant Examiner*—W. E. Duncanson, Jr.
*Attorney*—Anderson, Luedeka, Fitch, Even and Tabin

ABSTRACT: A system for controlling the speed of either a capstan or a head drum motor in a videotape recorder to phase lock the motor to a reference signal. The position of the capstan or drum motor is indicated by a tac pulse, which is compared in phase with the phase of the reference pulse by a phase detector which provides an output signal corresponding to the phase difference. The output signal from the phase detector is converted to current in a voltage-to-current converter and the current is fed to a sampling filter. The output from the sampling filter is employed to control the speed of the drum or capstan motor through a power amplifier. To provide long term position stability, an integrating capacitor is connected to the output of the phase detector. During the motor acceleration period, this integrating capacitor is clamped to a DC voltage approximately equivalent to the correct running speed of the capstan or drum motor.

Figures 1, 2:
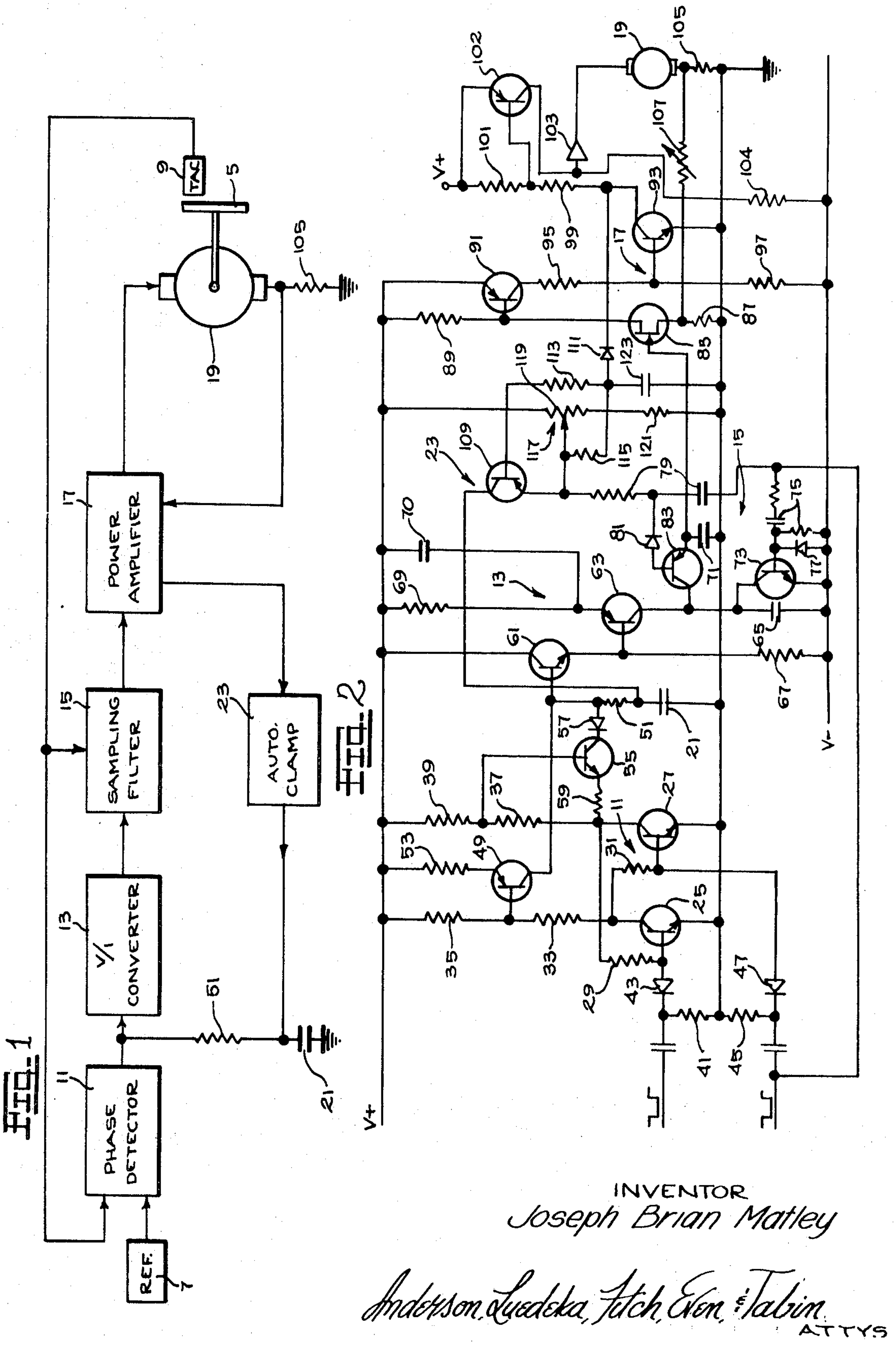

INVENTOR
Joseph Brian Matley

Anderson, Luedeka, Fitch, Even & Tabin
ATTYS

PHASE LOCK, SPEED CONTROL SYSTEM

The present invention relates to speed regulation of a videotape recorder and more particularly to a speed-regulating system to phase lock the head drum or the capstan motor in a helical scan, videotape recorder.

The speed and position or phase of the head drum motor in a helical scan videotape recorder is regulated, during recording, to record a certain portion of the television signal at a particular position on the tape. The speed and phase of the capstan motor is regulated, during recording, to produce proper longitudinal tape velocity. During playback, the speed and phase of the drum motor are regulated so that the transducer head reproduces at the same head-to-tape speed as during recording. The capstan motor speed and phase is regulated during playback to produce proper tracking of the video tracks recorded on the tape. Normally, the speed and phase of the drum or capstan motor are regulated by phase locking the motor to a reference which may be vertical sync, powerline frequency, an internal oscillator, or control track pulses.

It is important not only to determine the phase error and lock the head drum or capstan motor in phase with the synchronizing pulses or control track pulses but also to capture the motor to cause it to rotate at or near the required frequency before it can be locked in phase.

Many systems are available for phase locking the capstan or drum motor in a videotape recorder. One such system is disclosed in U.S. Pat. No. 3,355,649 which is assigned to the assignee of the present application. In the system disclosed in that patent, a head drum motor position-indicating signal or tac pulse is used to produce a trapezoidal signal including ramp portions extending from between a positive reference level and a negative reference level so that the ramp crosses zero at the time relative to the head position where it is desired that the reference pulse occurs. The ramp is sampled by the reference pulse to develop a signal directly related to the deviation of the head drum motor position from the desired position. The resultant error signal is used to control motor speed to phase lock the head drum motor position to the reference pulses. Also in this patent a capture circuit is provided to capture the head drum motor and bring it near the proper speed to permit the phase lock circuit to lock it to a particular phase relative to the reference pulses.

Another circuit for controlling the speed to phase lock the position of the head drum or capstan motor to a reference pulse is disclosed in a copending application, Ser. No. 799,872, filed Feb. 17, 1969, which application is assigned to the assignee of the present application. In the system disclosed in this copending application, the reference pulse and the tac pulse are compared in a forward-backward counter. The output of the forward-backward counter is a series of pulses having widths directly related to the phase difference between the reference pulse and the tac pulse. The output pulses are applied to a ramp generator which generates a ramp voltage which is sampled by the reference pulse. The voltage level of the ramp at sampling provides an error voltage which is indicative of the phase error of the drum or capstan motor as compared to the reference. This error voltage is utilized to drive the head drum motor or capstan motor.

The circuits employed in the system disclosed in U.S. Pat. no. 3,355,649 and in the system disclosed in patent application Ser. No. 799,872 have been relatively complicated, and hence, have been expensive to manufacture. For lower priced helical scan, videotape recorders, it is desirable to provide a simple relatively inexpensive circuit for controlling the speed of the drum or capstan motor to phase lock it to a reference signal.

An object of the present invention is to provide an improved system for controlling the speed of a capstan or a drum motor in a helical scan videotape recorder in order to phase lock it to a reference signal.

Another object is the provision of a system for controlling the speed and phase of a capstan or drum motor in a helical scan, videotape recorder which is relatively inexpensive to manufacture.

Other objects and advantages of the present invention will become apparent by reference to the following description and accompanying drawings, in which:

FIG. 1 is a block diagram of a control system in accordance with the present invention, and FIG. 2 is a schematic circuit diagram of a portion of the system shown in FIG. 1.

Generally, in accordance with the present invention, the control system is used to control the speed of either a capstan or a head drum 5 to phase lock the drum or capstan to a reference signal provided by a reference pulse source 7. The position or phase of the capstan or drum 5 is indicated by a tac pulse of fixed duration generated by a tachometer 9. The phase of the tac pulse is compared with the phase of the reference pulse by a phase detector 11 which provides an output voltage corresponding to the phase difference. The output voltage from the phase detector 11 is converted to current in a voltage-to-current converter 13 and the current is fed to a sampling filter or a sample-and-hold circuit 15. In the sampling filter 15, the current generates a ramp which is sampled by the tac pulses and the sampled voltage is stored. The stored signal is employed to control the speed of a drum or capstan motor 19 through a power amplifier 17 whose gain is limited by current feedback. To provide long term phase stability, an integrating capacitor 21 is connected to the output of the phase detector 11. During the motor acceleration period (after switch on or a torque disturbance outside the linear range of the power amplifier 17), this integrating capacitor 21 is clamped by an auto clamp circuit 23 to a DC voltage approximately equivalent to the correct running speed of the motor 19.

More particularly, in the illustrated embodiment, the reference pulse source 7 provides a series of reference pulses which may be vertical synchronizing pulses suitably derived from a television signal. Alternately, the pulses may be derived from the powerline frequency or a 60-hertz internal oscillator or from a control track on the tape. The tac pulses, which indicate the position or phase of the capstan or head drum 5, are generated by the tachometer 9. The tachometer 9 may be either a photo or magnetic type and is connected so as to provide a single pulse of fixed duration for each complete rotation of the capstan or drum 5.

The phase difference between the reference pulse and the tac pulse is determined by the phase detector 11 which, in the illustrated embodiment, is a bistable multivibrator in which the conducting transistor is triggered off by the reference or tac pulses. The illustrated bistable multivibrator 11 includes a pair of NPN-transistors 25 and 27, the bases and collectors of which are cross coupled by resistors 29 and 31. The emitters of the transistors 25 and 27 are grounded, the collector of transistor 25 is connected through a pair of series resistors 33 and 35 to a positive voltage supply (not shown) and the collector of transistor 27 is connected through a pair of series resistors 37 and 39 to the positive voltage supply.

The reference pulse, which is an inverted pulse, is differentiated by a differentiating circuit 41 and the differentiated reference pulse is rectified by a diode 43 in order to supply a sharp negative pulse corresponding to the leading edge of the reference pulse to the base of the transistor 25. Likewise, the tac pulse, which is an inverted pulse, is differentiated by a differentiating circuit 45, the differentiated signal is rectified by a diode 47 and the rectified signal is applied to the base of the other transistor 27. Thus, as long as the reference pulse and the tac pulse have the same rate and occur alternately (hereinafter referred to as "in phase"), the multivibrator 11 will operate with equal time intervals in each state. In other words, the multivibrator 11 will provide a square wave signal at its output. The duration of the output pulses will change if the reference pulse and tac pulse become out of phase.

The output of the multivibrator 11 is applied to the integrating capacitor 21 so that it linearly charges the capacitor in one of its states of operation and linearly discharges the capacitor in its other state. Thus, the charge on the integrating capacitor 21 remains substantially constant when the reference pulse and the tac pulse are in phase. The charge is increased if the drum or capstan speeds up and is decreased if the capstan or drum slows down. More particularly, integrating capacitor 21 is linearly charged by the multivibrator output by connecting the junction between the series resistors 33 and 35 in the collector circuit of the first transistor 25 in the multivibrator 11 to the base of a first voltage-to-current converting PNP-transistor 49 whose collector is connected through a series resistor 51 to one side of the integrating capacitor 21, the other side of which is grounded. The emitter of the transistor 49 is connected to the positive voltage supply through a high resistance 53. The integrating capacitor 21 is linearly discharged by a second voltage-to-current NPN-transistor transistor 55, whose base is connected to the junction between the series resistances 37 and 39 in the collector circuit of the second transistor 27 in the multivibrator 11. The collector of the second voltage-to-current transistor 55 is connected through a steering diode 57 to the upper side of the series resistor 51 and its emitter is connected through a high resistance 59 to the collector of the second transistor 27.

The error voltage developed across the resistor 51 and integrating capacitor 21 is converted to a current by complementary emitter followers 61 and 63, which comprise the voltage-to-current converter 13, and is stored in a storage capacitor 65. The complementary emitter follower circuit reduces the effects of temperature changes on the converter. By converting the error voltage to a current, the storage capacitor 65 is charged linearly thereby providing a linear ramp voltage across the capacitor 65. The illustrated complementary emitter followers 61 and 63 include an NPN-transistor having its emitter connected to the base of a PNP transistor. The base of NPN-transistor 61 is connected to the upper side of the resistor 51, its collector is connected to the positive voltage supply and its emitter is connected through an emitter biasing resistor 67 to a negative voltage supply (not shown). The emitter of the second complementary transistor 63 is connected through a high resistance 69 to the positive voltage supply and its collector is connected to one side of the storage capacitor 65. The other side of the storage capacitor 65 is connected to the negative voltage supply.

To reduce the phase shift through the sampling filter and thereby permit operation at a higher gain or faster response, a phase lead capacitor 70 is added to the system. As shown, the phase lead is provided by a capacitor 70 connected across the emitter resistor 69 of the second complementary transistor 63.

The reference-to-tac ripple frequencies are removed from the error voltage by the sampling filter 15, sometimes referred to as a sample-and-hold circuit. The sampling filter 15 provides a maximum attenuation at the ripple frequency and its harmonics with a linear phase shift/frequency relationship. The illustrated sampling filter 15 discharges the charge stored in the storage capacitor 65, allows the charge to linearly build up on the storage capacitor at a rate determined by the voltage developed across the series resistor 51 and the integrating capacitor 21, samples the resultant ramp at a rate determined by the tac pulses, stores the sampled voltage in a sampling capacitor 71, and then discharges the storage capacitor 65.

More particularly, the storage capacitor 65 is discharged by an NPN-switching transistor 73 having its emitter-collector circuit connected across the storage capacitor 65. The switching transistor 73 is rendered conductive by a trigger pulse corresponding to the trailing edge of the tac pulse. This trigger pulse is derived by coupling the tac pulse through a differentiating circuit 75, referenced to the negative voltage supply, to the base of the transistor 73. This base is connected to the negative voltage supply by a diode 77 that bypasses the pulse corresponding to the leading edge of the tac pulse.

After the storage capacitor 65 is discharged, the charge is permitted to build up at a rate determined by the voltage developed across the integrating capacitor 21 and the resistor 51. The charge buildup is sampled at a time determined by the leading edge of the tac pulse. The tac pulse is applied to a differentiating circuit 79 and the positive differentiated pulse is blocked by a diode 81 which permits the negative differentiated pulse corresponding to the leading edge of the tac pulse to be applied to the base of a PNP-switching transistor 83. The collector-emitter circuit of the second switching transistor 83 connects the upper side of storage capacitor 65 to the upper side of the sampling capacitor 71. The other side of the sampling capacitor 71 is grounded.

The voltage developed across the sampling capacitor 71 is fed directly to the power amplifier 17 whose input stage has a high impedance. As shown, the input stage is a field effect transistor 85 connected so as to operate at low drain current in the region where the gate-to-source voltage temperature coefficient approaches zero. The upper side of the sampling capacitor 71 is connected to the gate of the field effect transistor 85, the source of the field effect transistor is connected through a resistor 87 to ground and the drain of the field effect transistor is connected through a resistor 89 to the positive voltage supply.

The output of the field effect transistor 85 is amplified by a pair of transistor amplifiers 91 and 93. The first transistor amplifier 91 includes a PNP transistor whose base is connected to the drain of the field effect transistor 85, whose emitter is connected to the positive voltage supply and whose collector is connected through a pair of series resistors 95 and 97 to the negative voltage supply. The second amplifier 93 includes an NPN transistor having its base connected to the junction of the series resistors 95 and 97, its emitter grounded, and its collector connected through a pair of series resistors 99 and 101 to a second positive voltage supply (not shown). The junction between the series resistors 99 and 101 is connected through a PNP-transistor 102 to a DC amplifier 103, which may include complementary power output transistors, to one side of the motor 19, the other side of which is connected through a feedback resistor 105 to ground. Transistor 102 provides a phase inversion between the output of amplifier 93 and the input to amplifier 103, the latter of which is connected to the junction between the collector of transistor 102 and a collector supply resistor 104. Negative feedback is provided in the power amplifier 17 by connecting the voltage developed across the resistor 105 in series with the motor 19 through a series variable resistor 107 to the source of the field effect transistor 85.

The autoclamp circuit 23 is provided to set the speed of the motor 19 to within the acquisition range of the error voltage from the phase detector 11. This circuit 23 clamps the voltage on the integrating capacitor until correct speed is approached thereby avoiding speed hangup at half or twice the correct running speed. The illustrated circuit 23 clamps the voltage of the integrating capacitor 21 to a reference voltage during the motor acceleration period or in the absence of tac pulses. During the motor acceleration period, the collector of the second amplifier 93 in the power amplifier 17 is near ground potential since the transistor is in saturation. This condition is employed to turn on a transistor switch 109 to apply a clamping voltage to the integrating capacitor 21. More particularly, the collector of the second amplifier 93 is connected through a steering diode 111 and a resistor 113 to the base of the switching transistor 109. The switching transistor 109 is biased to cut off by connecting the junction of the resistor 113 and the diode 111 through a resistor 115, a voltage divider network 117 including a potentiometer 119 and a resistor 121 connected between the positive voltage supply and ground. The emitter of the transistor 109 is also connected to the voltage divider circuit 117 and its collector is connected to the junction of the resistor 51 and the integrating capacitor 21. Thus, when the switching transistor 109 is rendered conductive, the integrating capacitor 21 is clamped to a voltage determined by the setting of the voltage divider 117. A large capacitor 123 is connected between the junction of the diode 111 and the resistor 113 and ground to delay the release of the clamp until the power amplifier is driving the motor at the correct speed.

As can be seen from the above, a speed regulation system is provided for a capstan or a head drum motor in which a speed control loop and a phase lock loop are provided. The speed control loop provides speed control in the absence of reference pulses. A relatively simple phase detector (i.e., the flip-flop) is employed in the phase lock loop to provide phase lock error information. Maximum attenuation of the main ripple components in the phase lock error signal is provided with a minimum phase shift by the sampling filter. Fast response is thereby achieved in a phase lock speed control system. The phase lock error information from the phase detector is overriden until the correct operating speed is approached thus eliminating the speed hangups normally encountered in phase lock speed control systems.

Various changes and modifications may be made in the above-described speed control without deviating from the spirit or scope of the present invention.

Various features of the invention are set forth in the accompanying claims.

What is claimed is:

1. In a helical scan videotape recorder, a speed regulation system for phase-locking a head drum or a capstan motor to a reference signal, comprising means responsive to the position of the capstan or drum motor for providing a tac pulse indicating the phase of the motor, a phase detector comparing the phase of the reference pulse with the phase of the tac pulse and providing an output signal related to the phase difference, a sampling filter coupled to said phase detector and to said source of tac pulses for sampling the output signal in response to each tac pulse, and a power amplifier connected between said sampling filter and said motor for amplifying the output of said sampling filter and driving said motor in response to said output.

2. A speed regulation system in accordance with claim 1 in which an integrating capacitor is connected to the output of the phase detector, means is included which is responsive to the speed of the motor for providing a clamping voltage to said integrating capacitor when the speed of the motor is below a predetermined level.

3. A speed regulation system in accordance with claim 1 in which the phase detector is a flip-flop circuit which switches states in response to the reference pulse and the tac pulse.

4. A speed regulation system in accordance with claim 2 in which the phase detector is a flip-flop circuit which switches states in response to the reference pulse and the tac pulse, and means is provided for linearly discharging the integrating capacitor in response to the flip-flop operating in one state and linearly charging the integrating capacitor in response to the flip-flop operating in the other state.

5. A speed regulation system in accordance with claim 4 in which a storage capacitor is provided, means is connected between said integrating capacitor and said storage capacitor for converting the voltage developed across said integrating capacitor into a current and charging said storage capacitor with said current, and said sampling filter includes first switching means for discharging said storage capacitor in response to the trailing edge of each tac pulse, a sampling capacitor, and a second switching means for coupling the voltage developed across said storage capacitor at the leading edge of each tac pulse to said sampling capacitor, and the voltage developed across said sampling capacitor is fed to the input of said power amplifier.

6. A speed regulation system in accordance with claim 5 in which speed-responsive means included a means for providing a predetermined voltage, a third switching means for coupling said predetermined voltage to said integrating capacitor, and means responsive to said power amplifier operating in saturation for rendering said third switching means conductive.

* * * * *